United States Patent Office 3,137,686
Patented June 16, 1964

3,137,686
WATER-INSOLUBLE BENZIMIDAZOLONE
MONOAZO-DYESTUFFS
Erich Dietz, Kelkheim, Taunus, and Manfred Förderreuther and Karl Schilling, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 2, 1963, Ser. No. 269,890
Claims priority, application Germany Apr. 10, 1962
7 Claims. (Cl. 260—157)

The present invention relates to water-insoluble monoazo-dyestuffs and to a process for their manufacture; more particularly, it relates to novel dyestuffs of the following general formula

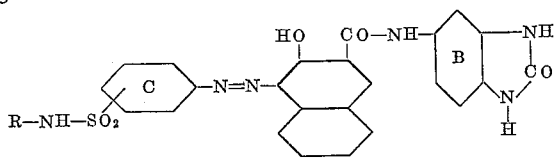

wherein the group R—NH—$SO_2$— stands in meta- or para-position to the azo group, R represents a hydrogen atom, an alkyl, cycloalkyl, hydroxyalkyl, alkenyl or acetyl radical or an aryl radical which may be substituted by non-ionic radicals, and the benzene nuclei B and C may be substituted by alkyl groups, alkoxy groups or halogen atoms.

We have found that valuable water-insoluble monoazo-dyestuffs possessing excellent fastness properties are obtained by coupling in substance, on the fiber or on another substratum the diazo compounds of amines having the following general formula

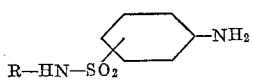

wherein the group R—HN—$SO_2$ stands in m- or p-position to the amino group, R represents a hydrogen atom, an alkyl, cycloalkyl, hydroxyalkyl, alkenyl or acetyl radical or an aryl radical which may be substituted by non-ionic radicals and the benzene nucleus may be substituted by alkyl groups, alkoxy groups or halogen atoms, with 5-(2'-hydroxy - 3' - naphthoylamino)-benzimidazolones which may be substituted in the benzene nucleus of the benzimidazolone radical by alkyl or alkoxy groups or halogen atoms.

As diazo components there may be used in the process of the present invention:

1-aminobenzene-3-sulfonic acid methylamide,
1-aminobenzene-3-sulfonic acid-i-propylamide,
1-aminobenzene-3-sulfonic acid-n-butylamide,
1-aminobenzene-3-sulfonic acid anilide,
1-aminobenzene-3-sulfonic acid-2'-chloranilide,
1-amino-2-methylbenzene-5-sulfonic acid amide,
1-amino-2-methylbenzene-5-sulfonic acid methylamide,
1-amino-2-methylbenzene-5-sulfonic acid ethylamide,
1-amino-2-methylbenzene-5-sulfonic acid-i-propylamide,
1-amino-2-methylbenzene-5-sulfonic acid anilide,
1-amino-2-methylbenzene-5-sulfonic acid-2'-methylanilide,
1-amino-2-methoxybenzene-5-sulfonic acid-4'-chloranilide,
1-amino-2-methoxybenzene-5-sulfonic acid amide,
1-amino-2-methoxybenzene-5-sulfonic acid methylamide,
1-amino-2-methoxybenzene-5-sulfonic acid ethylamide,
1-amino-2-methoxybenzene-5-sulfonic acid-i-propylamide,
1-amino-2-methoxybenzene-5-sulfonic acid-n-butylamide,
1-amino-2-methoxybenzene-5-sulfonic acid cyclohexylamide,
1-amino-2-methoxybenzene-5-sulfonic acid benzylamide,
1-amino-2-methoxybenzene-5-sulfonic acid anilide,
1-amino-2-methoxybenzene-5-sulfonic acid-2'-chloranilide,
1-amino-2-methoxybenzene-5-sulfonic acid-3'-chloranilide,
1-amino-2-methoxybenzene-5-sulfonic acid-4'-chloranilide,
1-amino-2-methoxybenzene-5-sulfonic acid-2'-methylanilide,
1-amino-2-methoxybenzene-5-sulfonic acid-2',5'-dichloranilide,
1-amino-2-methoxybenzene-5-sulfonic acid-2'-methoxyanilide,
1-amino-2-methoxybenzene-5-sulfonic acid-4'-methoxyanilide,
1-amino-2-methoxybenzene-5-sulfonic acid-2'-methyl-3'-chloranilide,
1-amino-2-chlorobenzene-5-sulfonic acid methylamide,
1-amino-2-chlorobenzene-5-sulfonic acid cyclohexylamide,
1-amino-2-chlorobenzene-5-sulfonic acid anilide,
1-aminobenzene-4-sulfonic acid ethylamide,
1-aminobenzene-4-sulfonic acid-n-butylamide,
1-aminobenzene-4-sulfonic acid anilide,
1-aminobenzene-3-sulfonic acid ethanolamide,
1-aminobenzene-4-sulfonic acid ethanolamide,
1-amino-2-chlorobenzene-5-sulfonic acid ethanolamide,
1-amino-2-chlorobenzene-5-sulfonic acid acetylamide,
1-amino-4-chlorobenzene-3-sulfonic acid ethanolamide,
1-amino-2-methylbenzene-5-sulfonic acid ethanolamide,
1-amino-2-methylbenzene-5-sulfonic acid allylamide,
1-amino-2-methoxybenzene-5-sulfonic acid ethanolamide,
1-amino-2-methoxybenzene-5-sulfonic acid allylamide,
1-amino-2-methoxybenzene-5-sulfonic acid acetylamide,
1-amino-2,5-dimethoxybenzene-4-sulfonic acid ethanolamide,
1-amino-2,5-dimethoxybenzene-4-sulfonic acid allylamide,
1-amino-2,5-dimethylbenzene-4-sulfonic acid ethanolamide.

Instead of the 2'-hydroxy-3'-naphthoyl compound of the 5-amino-benzimidazolone there may also be used the corresponding derivatives substituted in the benzene nucleus of the benzimidazolone radical by alkyl groups, alkoxy groups or halogen atoms, as for example:

5-(2'-hydroxy-3'-naphthoylamino)-6-chlorobenzimidazolone,
5-(2'-hydroxy-3'-naphthoylamino)-7-chlorobenzimidazolone,
5-(2'-hydroxy-3'-naphthoylamino)-6-methylbenzimidazolone,
5-(2'-hydroxy-3'-naphthoylamino)-7-methylbenzimidazolone,
5-(2'-hydroxy-3'-naphthoylamino)-7-methoxybenzimidazolone, or
5-(2'-hydroxy-3'-naphthoylamino)-7-bromobenzimidazolone.

For preparing the pigments it sometimes proves expedient that the coupling is carried out in such a manner that the diazo compound is introduced into the reaction vessel in an aqueous medium. After the addition of sodium acetate, an alkaline solution of the coupling component is then added, or a buffer mixture of sodium acetate and acetic acid is first introduced, and the diazo compound and the alkaline solution of the coupling component are then added simultaneously. It is advantageous to carry out the coupling in the presence of an anionic, cationic or non-ionic surface-active agent. The dyestuffs obtainable by the process of the present invention sometimes possess a hard grain. In order to produce the full tinctorial strength, they can either be heated in the form of an aqueous paste, if desired with the addition of an organic solvent, under pressure, at a temperature exceeding 100° C., preferably 120° to 180° C., or subjected in the form of the aqueous paste or of the dry dyestuff to an after-treatment with organic solvents. In this case, the application of compounds such as pyridine, dimethylformamide, N-methylacetamide or 1,2-dichlorobenzene, if desired at an elevated temperature, proved to be expedient.

The novel monoazo-dyestuffs are water-insoluble pigments which are distinguished by a very good fastness to solvents, to migration and to light. They are suitable for the preparation of printing colors and color lakes. They can also be used for coloring caoutchouc, natural resins and synthetic resins obtained by polymerization and condensation, more particularly, however, for fast coloring polyvinylchloride. Furthermore, the products obtainable by the process of the present invention can be used for coloring spinning solutions.

In contradistinction to the water-insoluble monoazo-dyestuffs disclosed in Belgian Patent 600,945 which have a similar composition but contain instead of the group —$SO_2$—NH—R— the group —CO—NH—R— in the benzene nucleus of the diazo component, the dyestuffs obtainable by the process of the present invention are distinguished by improved fastness properties, for example by an improved fastness to light.

The following examples serve to illustrate the invention, but they are not intended to limit it thereto, the parts and percentages being by weight unless otherwise stated and the relationship of parts by weight to parts by volume being the same as that of the kilogram to the liter.

*Example 1*

10.8 parts of 1-amino-2-methoxybenzene-5-sulfonic acid methylamide are dissolved in 30 parts by volume of 5 N-hydrochloric acid and 100 parts by volume of water and diazotized with 10.1 parts by volume of a 5 N-sodium nitrite solution, while cooling with ice. When the diazotization is complete, the solution is clarified with kieselguhr, and the nitrous acid in excess is removed with amido-sulfonic acid.

Moreover, 18 parts of 5-(2'-hydroxy-3'-naphthoylamino)-benzimidazolone are dissolved in 75 parts by volume of a 2 N-sodium hydroxide solution, diluted with 400 parts of water, and 3 parts by volume of a 10% aqueous solution of an emulsifier (a product obtained by the reaction of 1 mol of oleyl alcohol and 30 mols of ethylene oxide) are added.

Both solutions are made up to the same volume and are run simultaneously and at the same speed within ½ hour at room temperature, while quickly stirring, into a buffer solution containing 50 parts by volume of a 10% solution of the above-indicated emulsifier. When the coupling is complete, the solution is heated for 1 hour at 95° C. by introducing steam and then filtered. After washing out with water and drying, 27.5 parts of a red pigment possessing a soft grain and a high tinctorial strength are obtained. It is distinguished by a good fastness to light and solvents and an unobjectionable fastness to bleeding in polyvinylchloride containing plasticizer.

*Example 2*

10.1 parts of 1-amino-2-methoxybenzene-5-sulfonic acid amide are diazotized at 0° C. with 100 parts by volume of water, 30 parts by volume of 5 N-hydrochloric acid and 10.1 parts by volume of a 5 N-sodium nitrite solution. The nitrous acid in excess is removed with amido-sulfonic acid, and the solution is clarified with kieselguhr.

18 parts of 5-(2'-hydroxy-3'-naphthoylamino)-benzimidazolone are dissolved in 75 parts by volume of a 2 N-sodium hydroxide solution, diluted with 400 parts of water, and 3 parts by volume of a 10% solution of the emulsifier mentioned in Example 1 are added.

Both solutions are made up to the same volume and are run simultaneously and at the same speed within ½ hour at 20° C., while quickly stirring, into a buffer solution containing 50 parts by volume of 2 N-acetic acid, 50 parts by volume of 4 N-sodium acetate solution, 400 parts of water and 3 parts of a 10% solution of the above-indicated emulsifier. When the coupling is complete, the solution is heated for 1 hour at 95° C., by introducing steam and then filtered. After washing out with water and drying 27 parts of a pigment possessing a hard grain and a low tinctorial strength are obtained.

The dyestuff is heated for 2 hours at 120° C., while stirring, with 300 parts by volume of dimethylformamide. The mixture is diluted with 200 parts of methanol, the dyestuff is filtered off, washed with methanol, until colorless methanol runs off, and dried.

There are obtained 25 parts of a red pigment possessing a soft grain and a high tinctorial strength and distinguished by a good fastness to light and to solvents and a very good fastness to bleeding in polyvinylchloride.

*Example 3*

13.9 parts of 1-amino-2-methoxybenzene-5-sulfonic acid anilide are diazotized at 0° C. with 100 parts of water, 30 parts by volume of 5 N-hydrochloric acid and 10.1 parts of a 5 N-sodium nitrite solution. The nitrous acid in excess is removed with amido-sulfonic acid, and the solution is clarified with kieselguhr.

18 parts of 5-(2'-hydroxy-3'-naphthoylamino)-benzimidazolone are dissolved in 75 parts by volume of a 2 N-sodium hydroxide solution, diluted with 400 parts of water, and 3 parts by volume of a 10% solution of the emulsifier mentioned in Example 1 are added.

Both solutions are made up to the same volume and are run simultaneously and with the same speed at 20° C. within ½ hour, while quickly stirring, into a buffer solution containing 50 parts by volume of 2 N-acetic acid, 50 parts by volume of a 4 N-sodium acetate solution, 400 parts of water and 3 parts by volume of a 10% solution of the above-indicated emulsifier. When the coupling is complete, the solution is heated for 1 hour at 95° C. and then filtered. After washing out with water and drying 30.5 parts of a red pigment possessing a soft grain and a high tinctorial strength are obtained. It is distinguished by a good fastness to light and solvents and an unobjectionable fastness to bleeding in polyvinylchloride.

*Example 4*

10.8 parts of 1-amino-2-methoxybenzene-5-sulfonic acid methyl-amide are diazotized at 0° C. with 100 parts of water, 30 parts by volume of 5 N-hydrochloric acid and 10.1 parts of a 5 N-sodium nitrile solution. The nitrous acid in excess is removed with amido-sulfonic acid, and the solution is clarified with kieselguhr.

Moreover, 18.5 parts of 5-(2'-hydroxy-3'-naphthoylamino)-6-methyl-benzimidazolone are dissolved in 75 parts by volume of a 2 N-sodium hydroxide solution, diluted with 400 parts of water, and 3 parts by volume of a 10% aqueous solution of an emulsifier (a product obtained by the reaction of 1 mol of oleyl alcohol and 30 mols of ethylene oxide) are added.

Both solutions are made up to the same volume and are run simultaneously and at the same speed within ½ hour at 20° C., while quickly stirring, into a buffer solution containing 50 parts of 2 N-acetic acid, 50 parts by volume of a 4 N-sodium acetate solution, 400 parts of water and 3 parts of a 10% aqueous solution of the above-mentioned emulsifier. When the coupling is complete, the solution is heated for 1 hour at 95° C. by introducing steam. The dyestuff is filtered off, washed with water and dried. 28.5 parts of a red pigment possessing a hard grain and a low tinctorial strength are obtained.

The dyestuff is heated at 120° C. for 2 hours, while stirring with 300 parts by volume of dimethylformamide or pyridine. The mixture is diluted with 200 parts by volume of methanol, the dyestuff is filtered off, washed with methanol, until colorless methanol runs off, and dried.

There are obtained 24 parts of a red pigment possessing a soft grain and a high tinctorial strength and distinguished by a good fastness to light and solvents and a very good fastness to bleeding in polyvinylchloride.

A virtually identical product is obtained by heating the aqueous dyestuff press cake for 2 hours under pressure at 140° to 150°.

Example 5

11.7 parts of 1-amino-2-chlorobenzene-5-sulfonic acid ethylamide are diazotized at 0° C. with 100 parts by volume of water, 30 parts by volume of 5 N-hydrochloric acid and 10.1 parts by volume of a 5 N-sodium nitrite solution. The nitrous acid in excess is removed with amido-sulfonic acid, and the solution is clarified with kieselguhr.

20 parts of 5-(2'-hydroxy-3'-naphthoylamino)-7-chlorobenzimidazolone are dissolved in 75 parts by volume of a 2 N-sodium hydroxide solution, diluted with 400 parts of water, and 3 parts by volume of a 10% aqueous solution of an emulsifier (a product obtained by the reaction of 1 mol of oleyl alcohol and 30 parts of ethylene oxide) are added.

Both solutions are made up to the same volume and are run simultaneously and at the same speed within ½ hour at 20° C., while stirring quickly, into a buffer solution containing 50 parts by volume of 2 N-acetic acid, 50 parts by volume of a 4 N-sodium acetate solution, 400 parts of water and 3 parts by volume of a 10% aqueous solution of the above-indicated emulsifier. When the coupling is complete, the solution is heated for 1 hour at 95° C. by introducing steam, the dyestuff is filtered off, washed with water and dried. There are obtained 29 parts of a yellowish red pigment possessing a hard grain and a low tinctorial strength.

The dyestuff is heated for 2 hours at 120° C., while stirring, with 300 parts by volume of dimethylformamide. The mixture is diluted with 200 parts by volume of methanol, the dyestuff is filtered off, washed with methanol, until colorless methanol runs off, and dried.

There are obtained 21 parts of a pigment possessing a soft grain and a high tinctorial strength and distinguished by a good fastness to light and solvents and a very good fastness to bleeding in polyvinylchloride.

A virtually identical product is obtained by introducing the moist dyestuff press cake into 400 parts of 1,2-dichlorobenzene, subsequently heating until the water is removed, then filtering and removing the solvent from the press cake by distillation with steam.

Example 6

13 parts of 1-amino-2-methoxybenzene-5-sulfonic acid-n-butylamide are diazotized in usual manner at 0° C. with 30 parts by volume of 5 N-hydrochloric acid, 10 parts of a 5 N-sodium nitrite solution and 100 parts by volume of water, and the solution of the diazonium salt is made up with ice water to 500 parts by volume.

Moreover, 19 parts of 5-(2'-hydroxy-3'-naphthoylamino)-7-chlorobenzimidazolone are dissolved in 75 parts by volume of a 2 N-sodium hydroxide solution, and this solution is made up to 500 parts by volume.

The diazo solution and the solution of the coupling component are run simultaneously, while vigorously stirring, into a buffer mixture of sodium acetate and acetic acid first introduced into the reaction vessel and containing 400 parts by volume of water, 50 parts by volume of 2 N-acetic acid, 100 parts by volume of a 2 N-sodium acetate solution and 20 parts by volume of a 5% aqueous solution of oleylamine acetate.

When the coupling is complete, the mixture is heated for 1 hour at 95° to 100° C. and worked up subsequently in usual manner. There are obtained 34 parts of a clear red pigment dyestuff possessing a very good fastness to light, solvents, bleeding and overspraying.

Example 7

22.8 parts of 1-aminobenzene-4-sulfonic acid-n-butylamide are heated to 80° C. to 90° C. in 500 parts by volume of water and 60 parts by volume of 5 N-hydrochloric acid. After cooling to 0° C., the solution is diazotized with 20 parts by volume of a 5 N-sodium nitrite solution and made up to 1000 parts by volume.

Furthermore, 38 parts of 5-(2'-hydroxy-3'-naphthoylamino)-7-chlorobenzimidazolone are dissolved in 150 parts by volume of a 2 N-sodium nitrite solution, and this solution is made up to 1000 parts by volume.

The diazo solution and the solution of the coupling component are run simultaneously, while vigorously stirring, into a buffer mixture of sodium acetate and acetic acid first introduced into the reaction vessel and containing 400 parts by volume of water, 100 parts by volume of 2 N-acetic acid, 150 parts by volume of a 2 N-sodium acetate solution and 5 parts of an emulsifier-oil-mixture disclosed in German Patent 889,042.

When the coupling is complete, the whole is heated for 20 minutes at 95° to 100° C. by introducing steam, the dyestuff is filtered off and washed until neutral.

The moist filter cake is heated for 30 minutes at 100° C. in 1000 parts by volume of dimethylformamide, diluted with 500 parts by volume of methanol, the dyestuff is filtered off, washed with water and dried.

There are obtained 54 parts of a yellowish red pigment dyestuff possessing a very good fastness to light, solvents, bleeding and overspraying.

Example 8

Cotton is treated for 45 minutes at 35° C. at a goods-to-liquor ratio of 1:20 in the impregnating bath described hereinafter, squeezed off, dried and dyed completely at 20° C. in the developing bath described below. The material is then squeezed off, and after an air passage for 1 minute it is treated for 5 seconds with water of 70° to 80° C. in a bath containing per liter 3 parts by volume of hydrochloric acid of 20° Bé. The dyeings thus obtained are soaped and rinsed in usual manner.

*Impregnating bath.*—15.8 parts of 5-(2'-hydroxy-3'-naphthoylamino)-7-chlorobenzimidazolone are converted into a paste together with 50 parts of denatured ethyl alcohol, and after the addition of 15.5 parts by volume of a sodium hydroxide solution of 38° Bé. the whole is dissolved in about 1000 parts by volume of boiling water, and the solution is made up to 1000 parts by volume.

*Developing bath.*—12.8 parts of 1-amino-2-methoxybenzene-5-sulfonic acid-n-butylamide are diazotized in usual manner in the cold with 20.5 parts by volume of hydrochloric acid of 20° Bé. and 4 parts of sodium nitrite dissolved in water.

When the diazotization is complete, the solution is made up to 1000 parts by volume with 15 parts of sodium acetate dissolved in water and 2 parts of a commercial product of 20% strength obtained by the condensation of 1 mol of dodecyl alcohol and 30 mols of ethylene oxide.

The red dyeing thus obtained possesses a good fastness to light and an excellent fastness to organic solvents.

Example 9

13.8 parts of 1-amino-2,5-dimethoxybenzene-4-sulfonic acid ethanolamide are dissolved in 30 parts by volume of 5 N-hydrochloric acid and 100 parts by volume of water and diazotized, while cooling with ice, with 10.1 parts by volume of a 5 N-sodium nitrite solution. When the diazotization is complete, the solution is clarified with kieselguhr, and the nitrous acid in excess is removed with amido-sulfonic acid.

Furthermore, 18 parts of 5-(2'-hydroxy-3'-naphthoylamino)-benzimidazolone are dissolved in 75 parts by volume of a 2 N-sodium hydroxide solution, diluted with 400 parts of water, and 3 parts by volume of a 10% aqueous solution of an emulsifier (a product obtained by the reaction of 1 mol of oleyl alcohol and 30 mols of ethylene oxide) are added.

Both solutions are made up to the same volume and are run simultaneously and at the same speed within 30 minutes at room temperature, while quickly stirring, into a buffer solution containing 50 parts by volume of 2 N-acetic acid, 50 parts by volume of a 4 N-sodium acetate solution, 400 parts of water and 3 parts by volume of a 10% solution of the above-indicated emulsifier. When the coupling is complete, the solution is heated for 1 hour at 95° C. and filtered. After washing out with water and drying, 30.5 parts of a red violet pigment possessing a hard grain and a low tinctorial strength are obtained.

The dyestuff is heated for a short time at 100° C. with 300 parts by volume of dimethylformamide. The mixture is diluted with 200 parts by volume of methanol, the dyestuff is filtered off and washed with methanol, until colorless methanol runs off.

There are thus obtained 26 parts of a red violet pigment possessing a soft grain and a high tinctorial strength and distinguished by a good fastness to light and a very good fastness to solvents and bleeding in polyvinylchloride.

*Example 10*

11.1 parts of 1-amino-2-methoxybenzene-5-sulfonic acid allylamide are diazotized at 0° C. with 100 parts of water, 30 parts by volume of 5 N-hydrochloric acid and 10.1 parts by volume of a 5 N-sodium nitrite solution. The nitrous acid in excess is removed with amido-sulfonic acid, and the solution is clarified with kieselguhr.

18.5 parts of 5-(2'-hydroxy-3'-naphthoylamino)-6-methylbenzimidazolone are dissolved in 75 parts by volume of a 2 N-sodium hydroxide solution, diluted with 400 parts of water, and 3 parts by volume of a 10% solution of the emulsifier mentioned in Example 1 are added.

Both solutions are made up to the same volume and are run simultaneously and at the same speed, within 30 minutes, at 20° C., while quickly stirring, into a buffer solution containing 50 parts by volume of 2 N-acetic acid, 50 parts by volume of a 4 N-sodium acetate solution, 400 parts of water and 3 parts by volume of a 10% solution of the above-indicated emulsifier. When the coupling is complete, the solution is heated for 1 hour at 95° C. by introducing steam and filtered. After washing out and drying, 29.5 parts of a pigment possessing a hard grain and a low tinctorial strength are obtained.

The dyestuff is heated at 120° C. for 1 hour, while stirring, together with 300 parts by volume of dimethylformamide or pyridine. The whole is diluted with 200 parts by volume of methanol, the dyestuff is filtered off and washed with methanol, until colorless methanol runs off.

There are obtained 27 parts of a red pigment possessing a soft grain and a high tinctorial strength and distinguished by a good fastness to light and solvents and a very good fastness to bleeding in polyvinylchloride.

A virtually identical product is obtained by heating the aqueous dyestuff press cake for 2 hours at 140° C. to 150° C. under pressure.

*Example 11*

12.2 parts by weight of 1-amino-2-methoxybenzene-5-sulfonic acid acetylamide are dissolved in 30 parts by volume of 5 N-hydrochloric acid and 100 parts by volume of water and diazotized, while cooling with ice, with 10.1 parts by volume of a 5 N-sodium nitrite solution. When the diazotization is complete, the solution is clarified with kieselguhr, and the nitrous acid in excess is removed with amido-sulfonic acid.

Furthermore, 22 parts of 5-(2'-hydroxy-3'-naphthoylamino)-7-bromobenzimidazolone are dissolved in 75 parts by volume of a 2 N-sodium hydroxide solution, diluted with 400 parts of water, and 3 parts by volume of a 10% aqueous solution of an emulsifier (a product obtained by the reaction of 1 mol of oleyl alcohol and 30 mols of ethylene oxide) are added.

Both solutions are made up to the same volume and are run simultaneously and at the same speed within 30 minutes at room temperature, while quickly stirring, into a buffer solution containing 50 parts by volume of 2 N-acetic acid, 50 parts of a 4 N-sodium acetate solution, 400 parts of water and 3 parts by volume of a 10% solution of the above-indicated emulsifier. When the coupling is complete, the solution is heated for 1 hour at 95° C. by introducing steam and filtered. After washing out with water and drying, 32 parts of a pigment possessing a hard grain and a low tinctorial strength are obtained.

The dyestuff is mixed, while stirring, for 2 hours at room temperature with 300 parts by volume of dimethylformamide. The mixture is diluted with 200 parts by volume of methanol, the dyestuff is filtered off, washed with methanol, until colorless methanol runs off and dried. There are obtained 25 parts of a red pigment possessing a soft grain and a high tinctorial strength and distinguished by a good fastness to light and solvents and a very good fastness to bleeding in polyvinylchloride.

The following table contains further combinations of diazo and coupling components obtainable by coupling according to the processes described in the above examples.

| Diazo component | Coupling component | Tint |
| --- | --- | --- |
| 1-aminobenzene-3-sulfonic acid ethanolamide. | 5-(2'-hydroxy-3'-naphthoylamino)-benzimidazolone. | Red brown. |
| 1-aminobenzene-4-sulfonic acid ethanolamide. | -----do----- | Do. |
| 1-amino-2-methoxybenzene-5-sulfonic acid allylamide. | -----do----- | Red. |
| 1-amino-2-methoxybenzene-5-sulfonic acid ethanolamide. | -----do----- | Do. |
| 1-amino-2-methoxybenzene-5-sulfonic acetylamide. | -----do----- | Do. |
| 1-amino-2-chlorobenzene-5-sulfonic acid ethanolamide. | -----do----- | Red brown. |
| 1-amino-2-chlorobenzene-5-sulfonic acid acetylamide. | -----do----- | Do. |
| 1-amino-2,5-dimethoxybenzene-4-sulfonic acid ethanolamide. | -----do----- | Red violet. |
| 1-amino-2,5-dimethoxybenzene-4-sulfonic acid allylamide. | -----do----- | Do. |
| 1-amino-4-chlorobenzene-3-sulfonic acid ethanolamide. | -----do----- | Red. |
| 1-amino-2-methylbenzene-5-sulfonic acid ethanolamide. | -----do----- | Do. |
| 1-amino-2-methylbenzene-5-sulfonic acid allylamide. | -----do----- | Do. |
| 1-amino-2,5-dimethylbenzene-4-sulfonic acid ethanolamide. | -----do----- | Bluish red. |
| 1-amino-2-methoxybenzene-5-sulfonic acid allylamide. | 5-(2'-hydroxy-3'-naphthoylamino)-6-methylbenzimidazolone. | Red. |
| 1-amino-2-methoxybenzene-5-sulfonic acid ethanolamide. | -----do----- | Do. |
| 1-amino-2-methoxybenzene-5-sulfonic acid acetylamide. | -----do----- | Do. |
| 1-amino-2,5-dimethoxybenzene-4-sulfonic acid ethanolamide. | -----do----- | Blue violet. |
| 1-amino-2,5-dimethoxybenzene-4-sulfonic acid allylamide. | -----do----- | Do. |
| 1-amino-2-methoxybenzene-5-sulfonic acid ethanolamide. | 5-(2'-hydroxy-3'-naphthoylamino)-7-methylbenzimidazolone. | Red. |
| 1-amino-2-methoxybenzene-5-sulfonic acid allylamide. | 5-(2'-hydroxy-3'-naphthoylamino)-7-chlorobenzimidazolone. | Do. |
| 1-amino-2-methoxybenzene-5-sulfonic acid ethanolamide. | -----do----- | Do. |
| 1-amino-2,5-dimethoxybenzene-4-sulfonic acid ethanolamide. | -----do----- | Red violet. |
| 1-amino-2,5-dimethoxybenzene-4-sulfonic acid allylamide. | -----do----- | Do. |
| 1-amino-2-methoxybenzene-5-sulfonic acid ethanolamide | 5-(2'-hydroxy-3'-naphthoylamino)-6-chlorobenzimidazolone. | Red. |
| 1-aminobenzene-3-sulfonic acid methylamide. | 5-(2'-hydroxy-3'-naphthoylamino)-benzimidazolone. | Do. |
| 1-aminobenzene-3-sulfonic acid-i-propylamide. | -----do----- | Do. |
| 1-aminobenzene-3-sulfonic acid anilide. | -----do----- | Red brown. |
| 1-amino-2-methylbenzene-5-sulfonic acid ethylamide. | -----do----- | Red |
| 1-amino-2-methylbenzene-5-sulfonic acid-i-propylamide. | -----do----- | Do. |
| 1-amino-2-methylbenzene-5-sulfonic acid anilide. | -----do----- | Do. |
| 1-amino-2-methoxybenzene-5-sulfonic acid amide. | -----do----- | Do. |

| Diazo component | Coupling component | Tint |
|---|---|---|
| 1-amino-2-methoxybenzene-5-sulfonic acid methylamide. | _____do_____ | Do. |
| 1-amino-2-methoxybenzene-5-sulfonic acid ethylamide. | _____do_____ | Do. |
| 1-amino-2-methoxybenzene-5-sulfonic acid-i-propylamide. | _____do_____ | Do. |
| 1-amino-2-methoxybenzene-5-sulfonic acid-n-butylamide. | _____do_____ | Do. |
| 1-amino-2-methoxybenzene-5-sulfonic acid cyclohexylamide. | _____do_____ | Do. |
| 1-amino-2-methoxybenzene-5-sulfonic acid benzylamide. | _____do_____ | Do. |
| 1-amino-2-methoxybenzene-5-sulfonic acid anilide. | _____do_____ | Do. |
| 1-amino-2-methoxybenzene-5-sulfonic acid-2'-chloranilide. | _____do_____ | Do. |
| 1-amino-2-methoxybenzene-5-sulfonic acid-3'-chloranilide. | _____do_____ | Do. |
| 1-amino-2-methoxybenzene-5-sulfonic acid-4'-chloroanilide. | _____do_____ | Do. |
| 1-amino-2-methoxybenzene-5-sulfonic acid-2'-methylanilide. | _____do_____ | Do. |
| 1-amino-2-methoxybenzene-5-sulfonic acid-4'-methoxyanilide. | 5-(2'-hydroxy-3'-naphthoylamino)-benzimidazolone. | Do. |
| 1-amino-2-methoxybenzene-5-sulfonic acid-2',5'-dichloro-anilide. | _____do_____ | Do. |
| 1-amino-2-chlorobenzene-5-sulfonic acid methylamide. | _____do_____ | Brown. |
| 1-amino-2-chlorobenzene-5-sulfonic acid cyclohexylamide. | _____do_____ | Do. |
| 1-amino-2-chlorobenzene-5-sulfonic acid anilide. | _____do_____ | Red brown. |
| 1-amino-2-methoxybenzene-5-sulfonic acid ethylamide. | 5-(2'-hydroxy-3'-naphthoylamino)-6-chloro-benzimidazolone. | Red. |
| 1-amino-2-methylbenzene-5-sulfonic acid-i-propylamide. | -(2'-hydroxy-3'-naphthoylamino)-7-chloro-benzimidazolone. | Do. |
| 1-amino-2-methoxybenzene-5-sulfonic acid methylamide. | _____do_____ | Do. |
| 1-amino-2-methoxybenzene-5-sulfonic acid ethylamide. | _____do_____ | Do. |
| 1-amino-2-methoxybenzene-5-sulfonic acid-i-propylamide. | _____do_____ | Do. |
| 1-amino-2-methoxybenzene-5-sulfonic acid-n-butylamide. | _____do_____ | Do. |
| 1-amino-2-methoxybenzene-5-sulfonic acid anilide. | _____do_____ | Do. |
| 1-amino-2-methoxybenzene-5-sulfonic acid-2'-methyl-3'-chloroanilide. | _____do_____ | Do. |
| 1-amino-2-methoxybenzene-5-sulfonic acid-4'-chloroanilide. | _____do_____ | Do. |
| 1-aminobenzene-3-sulfonic acid-n-butylamide. | _____do_____ | Red brown. |
| 1-aminobenzene-4-sulfonic acid ethylamide. | _____do_____ | Red. |
| 1-aminobenzene-4-sulfonic acid-n-butylamide. | _____do_____ | Do. |
| 1-aminobenzene-4-sulfonic acid anilide. | _____do_____ | Do. |
| 1-amino-2-chlorobenzene-5-sulfonic acid-n-butylamide. | _____do_____ | Red brown. |
| 1-amino-2-chlorobenzene-5-sulfonic acid cyclohexylamide. | _____do_____ | Do. |
| 1-amino-2-chlorobenzene-5-sulfonic acid anilide. | _____do_____ | Yellowish red. |
| 1-amino-2-methylbenzene-5-sulfonic acid-i-propylamide. | 5-(2'-hydroxy-3'-naphthoylamino)-6-methyl-benzimidazolone. | Bluish red. |
| 1-amino-2-methoxybenzene-5-sulfonic acid methylamide. | _____do_____ | Red. |
| 1-amino-2-methoxybenzene-5-sulfonic acid-n-butylamide. | _____do_____ | Bluish red. |
| 1-amino-2-methoxybenzene-5-sulfonic acid cyclohexylamide. | _____do_____ | Red. |
| 1-amino-2-methoxybenzene-5-sulfonic acid anilide. | _____do_____ | Brown. |
| 1-amino-2-methoxybenzene-5-sulfonic acid-2'-chloranilide. | _____do_____ | Claret. |
| 1-amino-2-methoxybenzene-5-sulfonic acid-2'-methyl-anilide. | _____do_____ | Do. |
| 1-amino-2-chlorobenzene-5-sulfonic acid methylamide. | _____do_____ | Brown. |
| 1-amino-2-chlorobenzene-5-sulfonic acid cyclohexylamide. | _____do_____ | Do. |
| 1-amino-2-chlorobenzene-5-sulfonic acid anilide. | _____do_____ | Do. |
| 1-amino-2-methoxybenzene-5-sulfonic acid methylamide. | 5-(2'-hydroxy-3'-naphthoylamino)-7-methyl-benzimidazolone. | Bluish red. |
| 1-amino-2-methoxybenzene-5-sulfonic acid ethylamide. | 5-(2'-hydroxy-3'-naphthoylamino)-7-bromo-benzimidazolone. | Do. |
| 1-amino-2-methoxybenzene-5-sulfonic acid-n-butylamide. | _____do_____ | Do. |
| 1-amino-2-methoxybenzene-5-sulfonic acid ethylamide. | 5-(2'-hydroxy-3'-naphthoylamino)-7-methoxy-benzimidazolone. | Red. |
| 1-amino-2-methoxybenzene-5-sulfonic acid allylamide. | 5-(2'-hydroxy-3'-naphthoylamino)-7-bromo-benzimidazolone. | Do. |
| 1-amino-2-methoxybenzene-5-sulfonic acid ethanolamide. | _____do_____ | Do. |
| 1-amino-2-methoxybenzene-5-sulfonic acetylamide. | _____do_____ | Do. |
| 1-amino-2,5-dimethoxybenzene-4-sulfonic acid ethanolamide. | _____do_____ | Red violet. |
| 1-amino-2,5-dimethoxybenzene-4-sulfonic acid allylamide. | _____do_____ | Do. |
| 1-amino-2-methoxybenzene-5-sulfonic acid allylamide. | 5-(2'-hydroxy-3'-naphthoylamino)-7-methoxy-benzimidazolone. | Red. |
| 1-amino-2,5-dimethoxybenzene-4-sulfonic acid methylamide. | 5-(2'-hydroxy-3'-naphthoylamino)-benzimidazolone. | Red violet. |
| 1-amino-2,5-dimethoxybenzene-4-sulfonic acid ethylamide. | _____do_____ | Do. |
| 1-amino-4-chlorobenzene-3-sulfonic acid methylamide. | _____do_____ | Red. |
| Do. | 5-(2'-hydroxy-3'-naphthoylamino)-6-methyl-benzimidazolone. | Red brown. |
| 1-amino-2,5-dimethylbenzene-4-sulfonic acid methylamide. | 5-(2'-hydroxy-3'-naphthoylamino)-7-bromo-benzimidazolone. | Bluish red. |
| 1-amino-2-methoxy-5-methyl-benzene-4-sulfonic acid methylamide. | 5-(2'-hydroxy-3'-naphthoylamino)-benzimidazolone. | Do. |
| 1-amino-2-methoxy-5-chloro-benzene-4-sulfonic acid methylamide. | _____do_____ | Do. |
| 1-amino-2-chloro-5-methoxy-benzene-4-sulfonic acid methylamide. | _____do_____ | Red. |
| 1-amino-2,4-dimethoxybenzene-5-sulfonic acid methylamide. | _____do_____ | Red violet. |
| 1-amino-2-methoxy-4-chloro-benzene-5-sulfonic acid methylamide. | _____do_____ | Bluish red. |
| 1-amino-2-chloro-5-methyl-benzene-4-sulfonic acid methylamide. | 5-(2'-hydroxy-3'-naphthoylamino)-6-methyl benzimidazolone. | Orange. |
| 1-amino-2,5-dimethoxybenzene-4-sulfonic acid methylamide. | 5-(2'-hydroxy-3'-naphthoylamino)-6-methyl-benzimidazolone. | Red violet. |
| 1-aminobenzene-3-sulfonic acid methylamide. | _____do_____ | Yellowish brown. |
| 1-amino-2-methylbenzene-5-sulfonic acid isopropylamide. | _____do_____ | Bluish red. |
| 1-aminobenzene-3-sulfonic acid methylamide. | 5-(2'-hydroxy-3'-naphthoylamino)-7-bromo-benzimidazolone. | Yellowish red. |
| 1-amino-2-methoxy-benzene-5-sulfonic acid isopropylamide. | _____do_____ | Bluish red. |

We claim:
1. The water-insoluble monoazo-dyestuffs having the formula

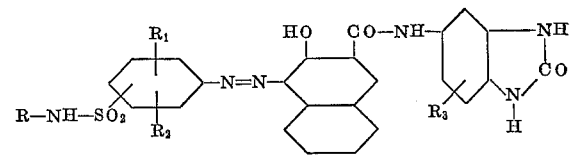

wherein the group R—NH—SO$_2$— is linked to the benzene nucleus in one of the positions meta and para to the azo group, R represents a member selected from the group consisting of a hydrogen atom, a lower alkyl group, a hydroxy lower alkyl group, a lower alkenyl group, an acetyl group, a cycloalkyl group, a phenyl group, a chlorophenyl group, a dichloro phenyl group, a lower alkyl-substituted phenyl group, a lower alkyl-substituted chlorophenyl group, a phenyl-substituted lower alkyl group, and a lower alkoxy-substituted phenyl group, $R_1$ and $R_2$ stand for a member selected from the group consisting of hydrogen atoms, lower alkyl groups, lower alkoxy groups and chlorine atoms, and $R_3$ represents a member selected from the group consisting of a hydrogen atom, a chlorine atom, a bromine atom, a lower alkyl group, and a lower alkoxy group.

2. The water-insoluble monoazo-dyestuff having the formula

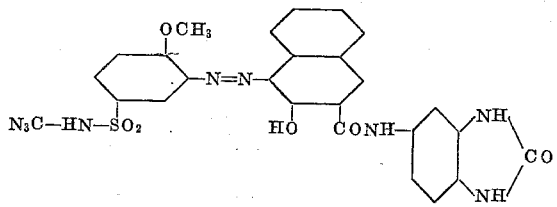

3. The water-insoluble monoazo-dyestuff having the formula

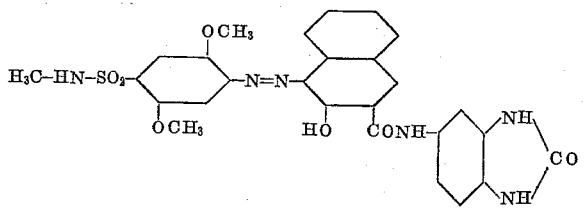

4. The water-insoluble monoazo-dyestuff having the formula

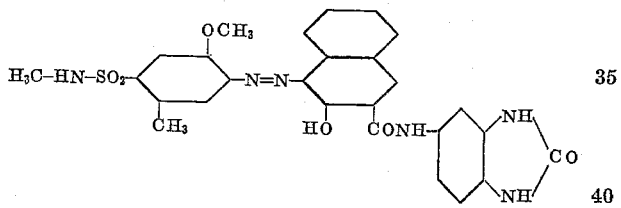

5. The water-insoluble monoazo-dyestuff having the formula

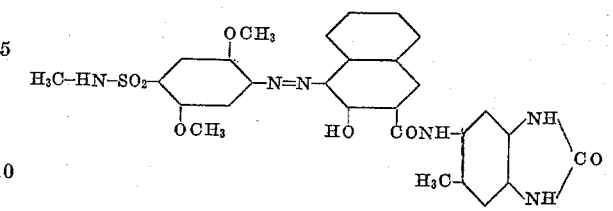

6. The water-insoluble monoazo-dyestuff having the formula

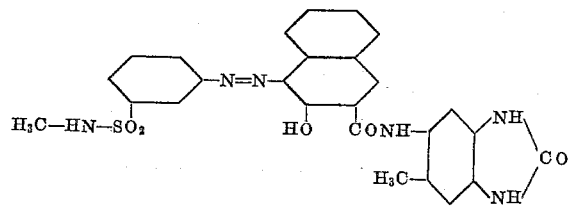

7. The water-insoluble monoazo-dyestuff having the formula

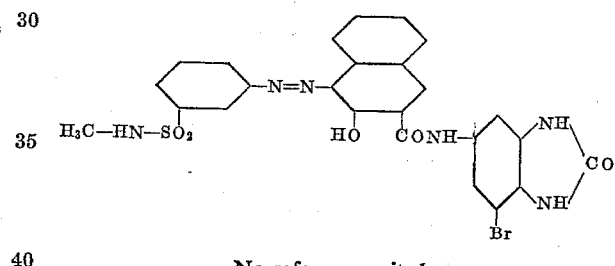

No references cited.